United States Patent [19]

Maertins et al.

[11] Patent Number: 4,597,675
[45] Date of Patent: Jul. 1, 1986

[54] MEAN TEMPERATURE SENSOR

[75] Inventors: Hans F. W. Maertins, Phoenix; James C. Mays, Mesa; Charles E. Corrigan, Tempe, all of Ariz.

[73] Assignee: The Garrett Corporation, Los Angeles, Calif.

[21] Appl. No.: 481,539

[22] Filed: Apr. 4, 1983

[51] Int. Cl.[4] .................. G01N 25/14; G01K 3/02
[52] U.S. Cl. .................. 374/115; 364/575; 374/144
[58] Field of Search ........... 374/143, 144, 135, 137, 374/115, 27; 165/32; 364/575

[56] References Cited

U.S. PATENT DOCUMENTS

| | | | |
|---|---|---|---|
| 1,159,893 | 11/1915 | Browne et al. | 60/531 |
| 2,504,588 | 4/1950 | Rinia | 374/135 |
| 2,698,872 | 1/1955 | Broffitt | 374/115 X |
| 3,229,755 | 1/1966 | Komarow | 165/32 |
| 3,348,414 | 10/1967 | Waters et al. | 374/144 |
| 3,393,101 | 7/1968 | Kirkpatrick | 374/144 |
| 3,433,929 | 3/1969 | Snelling | 219/363 |
| 3,451,266 | 6/1969 | Grover et al. | 374/29 |
| 3,509,768 | 5/1970 | Reynolds et al. | 374/166 X |
| 3,525,386 | 8/1970 | Grover | 165/32 |
| 3,566,092 | 2/1971 | Grant | 364/575 |
| 3,566,676 | 3/1971 | Hays | 374/30 X |
| 3,621,706 | 11/1971 | Markey | 374/27 |
| 3,623,367 | 5/1971 | Benedict | 374/115 |
| 3,712,053 | 1/1973 | Kofink | 165/105 |
| 3,968,689 | 7/1976 | Leshner | 374/115 |
| 4,067,237 | 1/1978 | Arcella | 374/113 X |
| 4,176,554 | 12/1979 | Kazmierowicz | 374/137 |
| 4,186,605 | 2/1980 | Bourigault | 374/115 |
| 4,298,947 | 11/1981 | Tamura et al. | 364/575 X |
| 4,484,823 | 11/1984 | Peuker | 374/27 |

OTHER PUBLICATIONS

Meanings of Mean, Average, Mediumvalue, etc.; McGraw Hill Dictionary of Physics & Mathematics, QC 5 M23; AU265; 1982.

Primary Examiner—Daniel M. Yasich
Attorney, Agent, or Firm—Terry L. Miller; Albert J. Miller

[57] ABSTRACT

Method and apparatus for producing a signal analogous to the means temperature of fluid within a flow path is in a turbo machine. The fluid flowing in the flow path has a nonconstant temperature considered transversely thereto and defining a temperature profile. An elongate thermosiphon is immersed substantially entirely in said fluid flow and extend transversely thereto for sensing a thermal characteristic of the vapor therein.

42 Claims, 5 Drawing Figures

MEAN TEMPERATURE SENSOR

BACKGROUND OF THE INVENTION

The field of the invention is apparatus and methods for sensing, or producing a signal analogous to, a temperature associated with fluid within a conduit. More particularly, the invention is concerned with the production of a signal which is analogous to the mean temperature of combustion products flowing in a turbo machine.

Turbo machines including combustion turbine engines such as turboshaft, turboprop and various kinds of jet engines are frequently rated, controlled and safeguarded by reference to a temperature of the working fluid flowing within the machine. In the specific case of turboshaft, turboprop and jet engines, it is common to sense the temperature of combustion products flowing from a combustor of the machine in order to assess the operating condition of the engine. However, experience has shown that the combustion products are not isothermal. In a nominal engine of a particular kind, the combustion products will display a considerable temperature variation or transverse temperature profile downstream of the combustor. Further, among serially produced like engines having an annular flow path for the combustion products, there will exist a considerable circumferential temperature variation in the combustion products under identical operating conditions. The reasons for such transverse and circumferential temperature variations are legion. Among these reasons are variations of the fuel and air distributions within particular combustors, differences due to tolerences in component parts of an engine, varying dispositions and relationships of fit of the associating components of an engine, and many other factors. Despite the variables affecting the temperature profiles of combustion products in serially produced engines, all the engines of a series will be rated and operated to the same nominal design or mean temperature of combustion products. Consequently, it is common to employ a multitude of thermocouples arrayed both circumferentially and transversely to sense the temperature of the combustion products at a multitude of discreet points. From the multitude of temperatures indicated by the thermocouples an average temperature is derived for use as a reference in operating and safeguarding an engine. Despite such measures, it is not uncommon for properly operating engines to be removed from service because the average temperature indicated by an array of thermocouples has erroneously indicated an overtemperature condition. Similarly, it sometimes happens that a true overtemperature condition will elude an array of thermocouples so that an engine is damaged in use.

Accordingly, it is recognized in the turbomachine art that an array of thermocouples, while providing an indication of average temperature of combustion products at discreet points, does not fulfill the requirement for measurement of mean temperature of working fluid within an engine. Further, it is recognized that such an average temperature is, at best, an approximation based on incomplete data, although it does provide some information about the operation of the engine by comparison to nominal design values. Reliance upon such approximated information is unsettling and vexatious to both designers and operators of turbo engines.

SUMMARY OF THE INVENTION

The present invention provides method and apparatus for producing a signal analogous to the arithmetic mean temperature of fluid flowing in a conduit.

Accordingly, the invention according to one aspect may be defined as apparatus comprising a flow path for communicating a flow of fluid therein, fluid flowing in said flow path having a nonconstant temperature considered transversely to said flow path so as to define a temperature profile, an elongate thermosiphon immersed substantially entirely in said fluid flow and extending transversely thereto, said thermosiphon defining at least one vaporizer section and at least one condenser section dependent upon said temperature profile, and means in association with said thermosiphon for sensing a characteristic of vapor therein and transducing said sensed characteristic to a signal analogous to the mean of said temperature profile.

According to another aspect, the present invention may be defined as the method of producing a signal which is analogous to the mean temperature of nonisothermal fluid flowing within a conduit, said method comprising the steps of providing an elongate thermosiphon adapted to be immersed substantially entirely within said fluid, disposing said thermosiphon transversely within said conduit, utilizing portions of said fluid having differing temperatures to define at least one vaporizer section and one condenser section for said thermosiphon, and providing means for sensing a characteristic of vapor within said thermosiphon and transducing said sensed characteristic to said signal.

DETAILED DESCRIPTION OF THE PREFERRED EMBODIMENT

Figure 1:
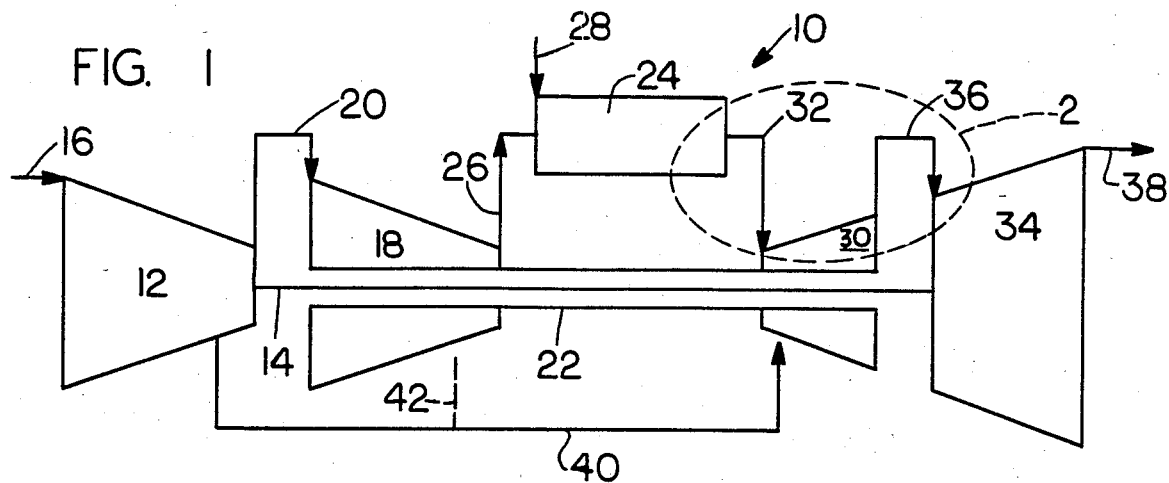
FIG. 1 schematically depicts a combustion turbine engine.

FIG. 1 schematically illustrates a combustion turbine engine or turbo machine 10. The engine 10 includes a first compressor section 12 which is rotatably driven by a shaft 14. Compressor section 12 inducts atmospheric air at ambient pressure, as is depicted by arrow 16. The air inducted by compressor section 12 is pressurized thereby for delivery to a second compressor section 18, as is depicted by arrow 20. An annular shaft 22 surrounds shaft 14 and rotatably drives the second compressor section 18 to further pressurize the inducted air. The pressurized air is then delivered to a combustor 24, as depicted by arrow 26, wherein fuel (arrow 28) is mixed therewith to sustain combustion. Pressurized combustion products flow from combustor 24 to a first turbine section 30, as is depicted by arrow 32. The pressurized combustion products are partially expanded in turbine section 30 to rotatably drive shaft 22 and compressor section 18. From turbine section 30, the partially expanded pressurized combustion products flow to a second turbine section 34 via a gas path which is depicted by arrow 36. After further expansion in turbine section 34, the combustion products are exhausted from the engine 10 as depicted by arrow 38. The expansion of combustion products in turbine section 34 rotatably drives the shaft 14 and compressor section 12. In order to provide cooling air flow to the turbine section 30, a portion of the inducted air is bled from compressor section 12 at a pressure level sufficient to insure cooling air flow to the turbine section 30, as is depicted by arrow 40. Alternatively, cooling air flow for turbine section 30 may be obtained as depicted by arrow 42 from the second compressor section 18.

Figure 2:
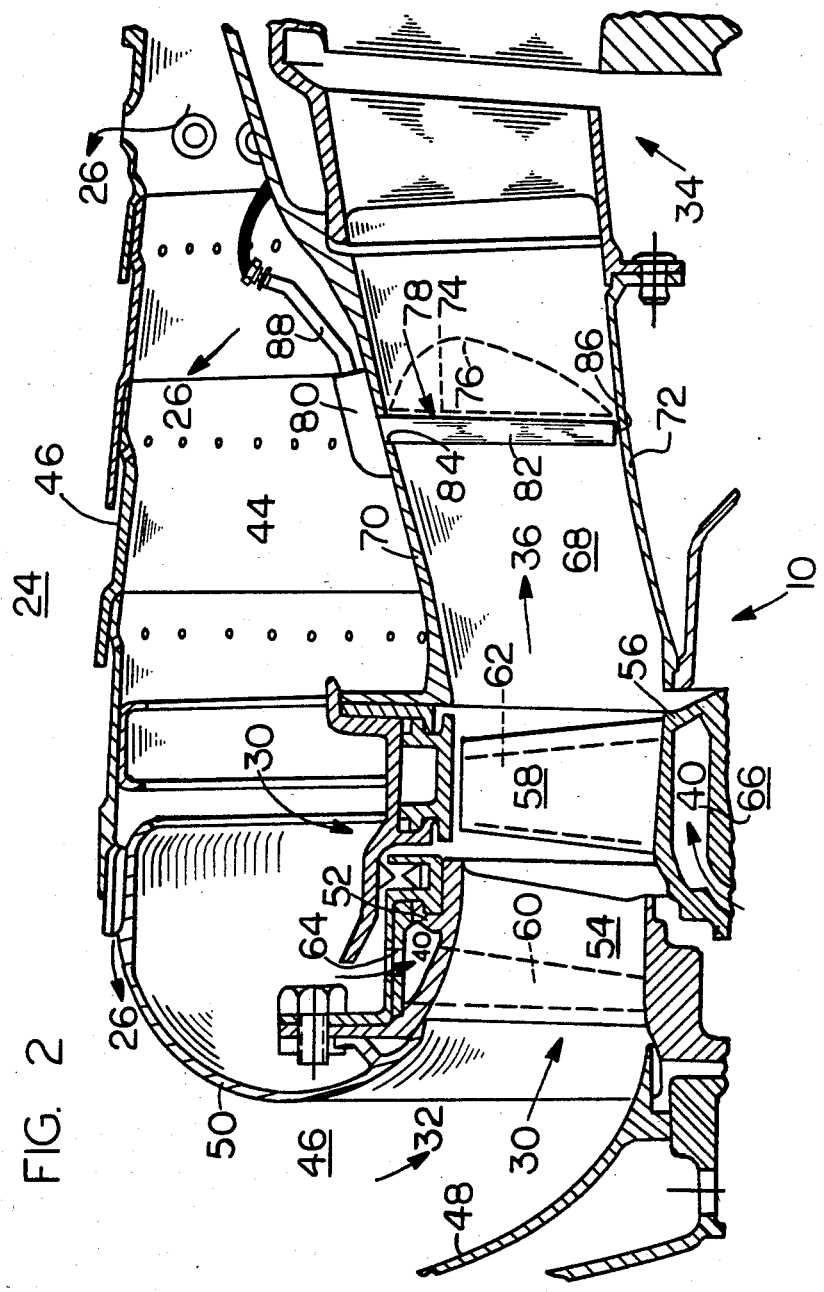
FIG. 2 is a fragmentary cross sectional view of the encircled portion of the engine depicted in FIG. 1.

Turning now to FIG. 2, a partial cross sectional view of a portion of engine 10, which portion is encircled in FIG. 1, is depicted. The engine 10 includes an annular plenum chamber 44 (only a portion of which is illustrated) receiving pressurized air from compressor section 18, and within which is disposed the combustor 24. Combustor 24 is of conventional annular reverse flow design and includes a pair of spaced apart perforated annular walls, only one of which, wall 46, is illustrated. A portion of the pressurized air (arrows 26) enters combustor 24 through the multitude of perforations defined in wall 46 to sustain combustion. Combustion products (arrow 32) from the combustor 24 flow to the first turbine section 30 via a transition duct 46 having a pair of spaced apart walls 48,50. The walls 48,50 lead to a stator portion 52 of the first turbine section 30. Stator portion 52 includes a circumferentially arrayed multitude of radially extending nozzle vanes 54, only one of which is visible viewing FIG. 2. The nozzle vanes 54 define between them a multitude of convergent flow passages through which the combustion products 32 flow on their way to a rotor portion 56. Rotor 56 includes a circumferentially arrayed multitude of radially extending turbine blades 58. The combustion products (arrow 32) impinging on the turbine blades 58 rotatably drives the rotor 56 and shaft 22, recalling FIG. 1.

In order to cool the nozzle vanes 54 and turbine blades 58, each defines respective radially extending cavities 60,62 therein, which are shown in dashed lines viewing FIG. 2. The cavity 60 opens radially outwardly at an aperture 64 to receive pressurized air from plenum chamber 44 (as depicted by arrow 40, viewing FIG. 2). Similarly, the cavity 62 opens radially inwardly to a distribution chamber 66 defined within turbine rotor portion 56. The chamber 66 also receives pressurized air, depicted by an arrow 40, via passages which are not shown. Pressurized and relatively cool air admitted to the cavities 60,62 is communicated to the outside of the nozzle vanes 54 and turbine blades 58 by a multitude of relatively small cooling passages (not illustrated) defined in each. The small cooling passages are distributed both radially and axially over the externally exposed surfaces of the vanes 54 and blades 58 to establish a desired cooling airflow therefor.

Downstream of the turbine rotor portion 56, the combustion products (arrow 36) are communicated to the second turbine section 34 via a flow passage 68. The passage 68 is defined by the cooperation of a pair of radially spaced apart annular walls 70 and 72. The passage 68 leads to the second turbine section 34, which is conventional and will not be described further herein.

Because of the nature of the combustion process within combustor 24 and the location and number of perforations in the latter, as well as the cooling air mixed with the combustion products 32 as they pass between nozzle vanes 54 and turbine blades 58, the partially expanded combustion products 36 in passage 68 have a nonuniform temperature. In other words, the combustion products 36 are nonisothermal and define a temperature profile within passage 68. For purposes of illustration, the temperature profile of combustion products 36 is depicted in FIG. 2 by use of a temperature datum line 74 and a temperature profile line 76. Thus, the temperature of combustion products 36 at any selected point on line 74 is analogous to the horizontal spacing between the lines 74 and 76 at the selected point.

As pointed out supra, engine-to-engine variations in the tolerances and relative positions of various engine components results in variations of the temperature profile 76 among serially produced engines. Because proper engine operation is frequently determined by reference to the temperature of combustion products 36, it is desirable to sense the mean of the profile 76. In this way, engine-to-engine variations of the individual profile 76 of each engine are averaged out and proper engine operation can be distinguished from defective overtemperature operation requiring corrective action.

In order to sense the mean temperature of combustion products 36, a sensor 78 is provided in the passage 68. The sensor 78 includes a base portion 80 which is secured to the wall 70 within the plenum chamber 44 and remote from the passage 68. An elongate cylindrical housing portion 82 extends from the base portion 80 through an aperture 84 in wall 70 and into the passage 68. The housing portion 82 extends tranversely across the passage 68 to terminate in an end 86 closely adjacent to, but short of, the wall 72. Also extending from the base portion 80 is a signal-carrying cable 88. The cable 88 extends to a remote temperature responsive or indicating device. For example, the cable 88 may extend to an indicating device within the cockpit of an aircraft.

Figure 3:
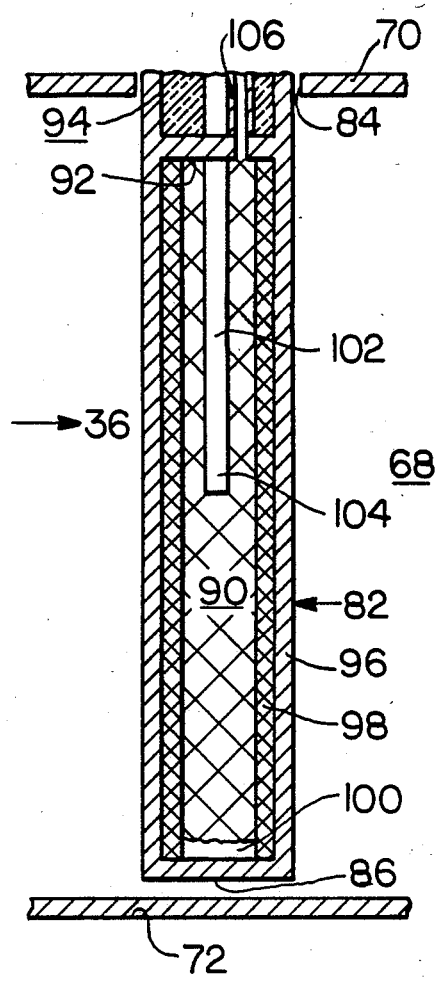
FIG. 3 is an enlarged partially cross sectional and fragmentary view of a temperature sensor also depicted in FIG. 2.

Turning now to FIG. 3, the housing portion 82 of sensor 78 is illustrated with greater particularity. Viewing FIG. 3, it will be seen that the housing portion 82 is substantially hollow to define an elongate chamber 90 therein. The chamber 90 extends substantially from the wall 70 to the wall 72. At one end of the housing portion 82 (the upper end viewing FIG. 3), a septum 92 sealingly separates the chamber 90 from a hollow space 94 within the housing portion 82. The hollow space 94 is packed with thermal insulation in order to inhibit heat transfer from that part of housing portion 82 which is in passage 68 to the base portion 80 and wall 70. Both the base portion 80 and wall 70 are exposed to relatively cool air in plenum chamber 44, recalling FIG. 2.

A circumferentially extending side wall 96 of chamber 90 is lined with a layer of wicking material 98. Disposed within the chamber 90 is a selected quantity of material 100 which exists in a two-phase state at the operating temperature of engine 10 as represented by combustion products 36. In other words, the material 100 exists both as staturated vapor, which permeates the chamber 90, and as saturated liquid, which is contained mostly within the wicking material 98. Under the particular conditions of operation depicted, a quantity of the material 100 is also disposed at the lower end of chamber 90, although such may not be the case under different operating conditions. Further, it should be noted that the chamber 90 is substantially evacuated and free of gases and vapors other than the vapors of material 100. Consequently, the absolute pressure of vapor within chamber 90 is entirely that of the vapor pressure of material 100 so that a unique relationship exists between the pressure of vapor in chamber 90 and its temperature. It will be recognized that the sensor 78 defines a specie of thermosiphon or heat pipe.

In order to complete the description of FIG. 3, it should be noted that an elongate thermocouple probe 102 sealingly extends through the septum 92 and into the chamber 90. The probe 102 comprises a thermocouple junction 104 at its lower end 104. The thermocouple junction of probe 102 is spaced from the side walls 96 of housing protion 82 and is also spaced from the base portion 80 because of the length of probe 102. Consequently, the thermocouple junction of the probe 102 is substantially thermally isolated so that its temperature is substantially the temperature of vapor within chamber 90. The probe 102 extends through the hollow space 96 to base member 80. Cable 88 (recalling FIG. 2) is electrically coupled with the thermocouple junction of probe 102 so that the voltage signal provided thereby may be conducted externally of engine 10.

Further, sensor 78 includes a fill tube 106 which sealingly couples with the septum 94 to open to chamber 90. Fill tube 106 extends through hollow space 96 to open on base member 80. During manufacture of sensor 78, the fill tube 106 is employed to evacuate chamber 90 and introduce material 100, after which the end of fill tube 106 at base member 80 is permanently sealed.

Figure 4:
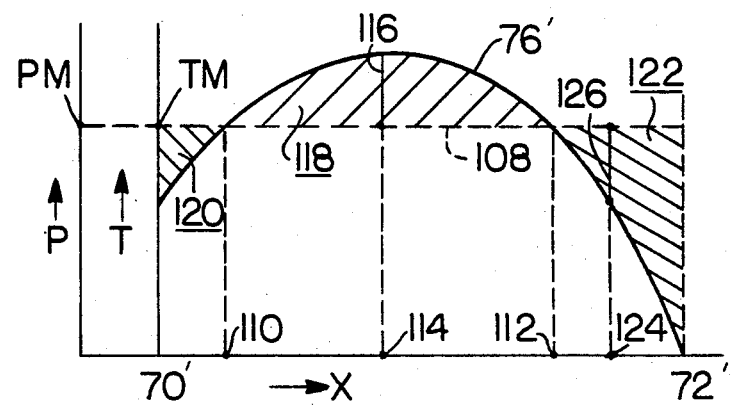
FIG. 4 depicts a graph setting forth information about the engine of FIGS. 1 and 2, and the temperature sensor of FIGS. 2 and 3.

During operation of engine 10, the combustion products 36 are nonisothermal and define a temperature profile 76, as explained supra. Viewing FIG. 4, it will be seen that an exemplary temperature profile line 76' for engine 10 has been laid out on a graph. The point 70' represents a station on sensor 78 adjacent to wall 70 while the point 72' represents a station adjacent to wall 72 of engine 10. Along the left side of the graph of FIG. 4 are two scales. The 'T' scale represents temperature of vapor within chamber 90 while the 'P' scale represents absolute pressure within chamber 90. Because the material 100 within chamber 90 is substantially isothermal and exists contemporaneously in two phases as saturated vapor and saturated liquid, there exists a unique relationship between temperature and pressure of the vapor of material 100. Accordingly, for each temperature point on scale 'T' there exists a unique pressure point on scale 'P', and vice versa.

Viewing FIG. 4, it will be seen that an arbitrary mean vapor pressure (and mean temperature) line 108 is depicted. Because the temperature profile line 76' exceeds the mean temperature line 108 between points 110 and 112, the portion of sensor 78 therebetween defines a vaporizer section wherein saturated liquid changes phase to become saturated vapor. It will be noted such a change of phase takes place without a change of temperature. Consequently, the driving force for the change of phase from liquid to vapor is represented by the vertical distance between line 76' and 108 within the evaporator section. For example, the rate of vaporization at point 114 is analogous to the length of vertical line 116. Thus, lines 76' and 108 cooperate to bound a region 118, the area of which is analogous to the rate of change of liquid to vapor.

Conversely, the temperature profile line 76' also cooperates with line 108 to define a pair of regions 120 and 122 wherein the sensor 78 defines condenser sections. Condensation of saturated vapor to saturated liquid also takes place at constant temperature. Therefore, the driving force for condensation at a station of sensor 78 is analogous to the vertical distance between lines 76' and 108. For example, the rate of condensation at point 124 is analogous to the length of vertical line 126. Consequently, lines 76' and 108 cooperate to bound the regions 120 and 122, such that the total of the areas of these regions is analogous to the rate of change of vapor to liquid.

Further to the above, it must be recognized that the rate of vaporization in sensor 78 must, over time, exactly match the rate of condensation. Thus, it can be appreciated that the mean pressure of vapor in chamber 90 and the vertical position of line 108 is not arbitrary, but is that necessary to establish dynamic equilibrium between condensation and vaporization. Further recognizing that the heat of vaporization of material 100 is precisely equal to the heat librated upon condensation, and assuming that the thermal conductivity of wall 96 and wick 98 is everywhere the same, it follows that the area of region 118 substantially matches the total of the areas of regions 120 and 122. Thus, the point Tm where line 108 crosses scale 'T' is the mean of temperature profile 76'.

Viewing FIG. 4 once again, and recalling the description thereof, it will be seen that the temperature sensed by the thermocouple junction at end 104 of probe 102 must closely correspond to the temperature of vapor in chamber 90 and to the mean temperature of the combustion products 36. However, a caveat must be recognized with regard to sensor 78. That is, there inherently must be a slight vapor pressure difference between the exaporator section(s) of the chamber 90 and the condenser section(s) thereof to provide movement of vapor therein. Of course, such a difference in vapor pressure requires a corresponding difference in vapor temperature. Thus, depending upon the location of the thermocouple junction and the nature of the temperature profile 76 causing the evaporator and condenser sections to be formed, the sensed temperature may the vaporization temperature, or the condensation temperature, or a temperature therebetween. However, the possible temperature error introduced by vapor pressure differences within chamber 90 is believed to be small and of little significance.

In a working embodiment of the sensor 78, the housing portion 82 was fabricated from Inconel while Sodium was used as the material 100. Tests of this working embodiment in an aircraft propulsion jet engine showed a very good analogy between the sensed mean temperature and the computed average temperature in passage 36 as determined by use of conventional thermocouple rakes. However, these test results showed an offset between sensed mean temperature and computed average temperature. This offset is believed to be due to inadequate thermal isolation of the housing portion 82, and also, possibly of the thermocouple junction of probe 102.

Figure 5:
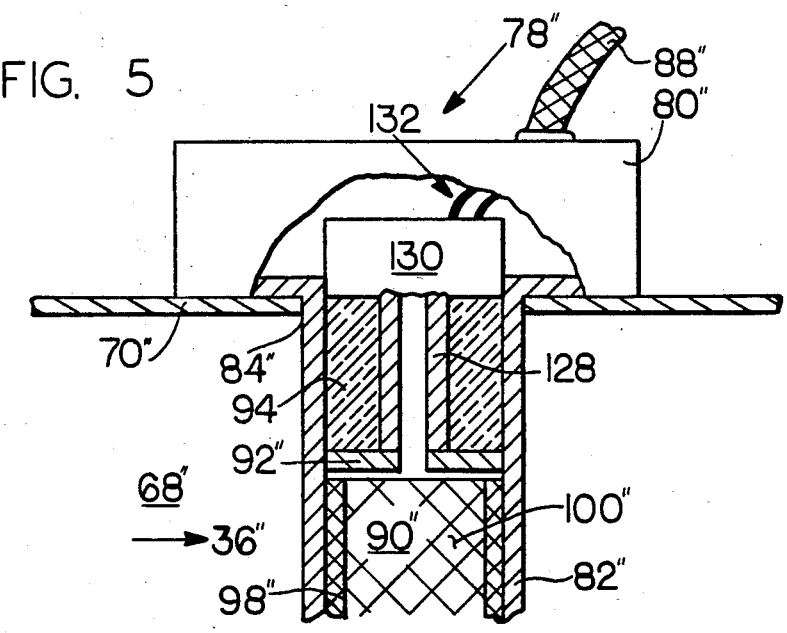
FIG. 5 depicts a fragmentary and partially cross sectional view of an alternative embodiment of the invention.

FIG. 5 illustrates an alternative embodiment of the invention wherein features which are analogous in structure or function to that of FIG. 2 are referenced with the same numeral used previously and with a double prime added. Viewing FIG. 5, a sensor 78" is depicted having a base portion 80" secured to a wall 70". A housing portion 82" extends from base portion 80" through an aperture 84" in wall 70" and into a passage 68". Similarly to sensor 78, the sensor 78" defines a chamber 90" having wick material 98" and two-phase material 100" therein. The chamber 90 is bounded by a septum 92" while a tube 128 couples with the latter to communicate chamber 90" with an apparatus 130. The apparatus 130 is a pressure-to-electrical transducer and is coupled with a cable 88" via conductors 132. By way of example, the apparatus 130 may be a capacitive, or resistive pressure-to-electrical transducer. Recalling FIG. 4, the absolute pressure of vapor within chamber 90" has a unique value for every temperature of two-phase medium 100". Thus, the sensor 78" by responding to the vapor pressure within chamber 90" provides an electrical signal which is analogous to the mean temperature of combustion products 36".

While the present invention has been depicted and described by reference to two preferred embodiments thereof, no limitation upon the invention is implied by such reference and none is to be inferred. The invention is intended to be limited only by the scope and spirit of the appended claims which provide a definition of the invention.

We claim:

1. Apparatus comprising a flow path for communicating a flow of fluid therein, fluid flowing in said flow path having a nonconstant temperature which is considered transversely to said flow path so as to define a temperature profile, an elongate thermosiphon immersed substantially entirely in said fluid flow and extending transversely thereof, said thermosiphon defining at least one vaporizer section and at least one condenser section dependent upon said temperature profile, and means in communication with said thermosiphon for sensing the temperature or absolute pressure of vapor therein and transducing said sensed temperature or pressure to a signal analogous to the means of said temperature profile.

2. The invention of claim 1 wherein said sensed characteristic comprises the temperature of said vapor.

3. The invention of claim 2 wherein said sensing means comprises a thermocouple.

4. The invention of claim 1 wherein said sensed characteristic comprises the absolute pressure of said vapor.

5. The invention of claim 4 wherein said sensing means comprises a pressure-to-electrical transducer.

6. The invention of claim 1 wherein said thermosiphon comprises an elongate housing defining a closed elongate chamber therein, wick means substantially covering the surface of said chamber, and a predetermined quantity of a vaporizable liquid disposed within said chamber.

7. The invention of claim 1 wherein said apparatus comprises a combustion turbine engine, said flow of fluid comprising combustion products of said engine.

8. The method of producing a signal which is analogous to the mean temperature of nonisothermal fluid flowing within a conduit, said method comprising the steps of:
providing an elongate thermosiphon adapted to be immersed substantially entirely within said fluid;
disposing said thermosiphon transversely within said conduit;
utilizing portions of said fluid having differing temperatures to define at least one vaporizer section and at least one condenser section for said thermosiphon; and
providing means for sensing the temperature or pressure of vapor within said thermosiphon and transducing said sensed temperature or pressure to said signal.

9. The method of claim 8 wherein said step of providing said sensing means includes disposing a temperature responsive element within said thermosiphon in heat exchange relationship with said vapor.

10. The method of claim 9 wherein said step of providing sensing means includes utilizing a thermocouple as said temperature responsive element.

11. The method of claim 8 wherein said step of providing said sensing means includes disposing an element responsive to absolute pressure in pressure transmitting relationship with said vapor.

12. In a turbo machine defining a fluid flow path, fluid flowing in said flow path being nonisothermal to define a transverse temperature profile, a sensor apparatus defining an elongate chamber substantially entirely within and transverse to said flow path, a determined quantity of material disposed within said chamber which is two-phase liquid/vapor during operation of said turbo machine, said chamber being otherwise substantially evacuated, and means communicating with said chamber for sensing one of the absolute vapor pressure within said chamber and the temperature of vapor within said chamber, said sensing means including means for producing a signal analogous to said one sensed pressure and temperature.

13. The invention of claim 12 wherein said sensor further includes wick material substantially lining said elongate chamber.

14. The invention of claim 12 wherein said sensor includes a base portion secured to said turbo machine, an elongate housing portion extending from said base portion transversely to the direction of said fluid flow, said housing portion substantially defining said elongate chamber, said housing portion further defining a septum bounding said elongate chamber and a thermally isolating hollow space disposed between said septum and said base member.

15. The invention of claim 14 wherein said sensing means includes an elongate probe extending from said base portion through said hollow space and through said septum to terminate in an end disposed within said chamber and spaced from said housing portion.

16. The invention of claim 15 wherein said signal producing means includes a temperature responsive element associated with said probe end for producing said signal, and means for communicating said signal externally of said probe.

17. The invention of claim 16 wherein said temperature responsive element comprises a thermocouple.

18. The invention of claim 14 wherein said sensing means includes an element responsive to absolute pressure, and means communicating said element with said elongate chamber.

19. In a turbo machine defining a fluid flow path, fluid flowing within said flow path being nonisothermal to define a temperature profile, the method of producing a signal analogous to a mean of said temperature profile comprising: defining a closed chamber of an elongated sensor transversely disposed substantially entirely within said flow path and in heat transfer relation with said fluid, disposing in said chamber a predetermined quantity of a two-phase liquid/vapor material, utilizing portions of said fluid flow having differing temperatures to respectively vaporize and condense said two-phase material, sensing the temperature or absolute pressure of the vapor phase of said two-phase material within said chamber, and producing said signal in response to the level of said temperature or said absolute pressure.

20. The method of claim 19 including the step of utilizing a thermocouple to sense the temperature of said vapor and produce an electrical signal analogous thereto.

21. The method of claim 19 including the step of utilizing a pressure-to-electrical transducer to sense the absolute pressure of said vapor and produce an electrical signal analogous thereto.

22. Sensor apparatus particularly for sensing a mean temperature of working fluid flowing within a flow path of a turbo machine, said sensor apparatus comprising:

a base portion adapted for securement to a wall of said turbo machine remotely from said flow path;

an elongate housing portion extending from said base portion and terminating in an end spaced therefrom, said base portion and said housing portion defining cooperating means for substantially thermally isolating one from the other, said housing portion being adapted to penetrate said turbo machine wall into said flow path and to extend substantially thereacross transversely to said working fluid flow, said housing portion substantially defining an elongate closed chamber extending from proximate said end toward said base portion, said elongate chamber substantially ending short of said base portion;

a predetermined quantity of two-phase material which simultaneously exists both as liquid and vapor at said mean temperature disposed within said elongate chamber; and means in communication with said elongate chamber for sensing one of the absolute pressure therein and the temperature of vapor therein, said sensing means further including means for tranducing the sensed one of said absolute pressure and vapor temperature into an intelligible signal.

23. The invention of claim 22 wherein said sensing means includes an elongate probe extending from said base portion into said elongate chamber of said housing postion, said tranducing means comprising a temperature responsive element carried by said probe in heat exchange relation with vapor within said elongate chamber, said temperature responsive element being substantially thermally isolated from both said base portion and said housing portion.

24. The invention of claim 23 wherein said temperature responsive element comprises a thermocouple.

25. The invention of claim 22 wherein said sensing means comprises a passage communicating said absolute pressure from said elongate chamber to said base portion, said tranducing means comprising a pressure responsive element disposed upon said base portion and communicating with said passage so as to respond to said absolute pressure.

26. The invention of claim 25 wherein said pressure responsive element comprises a pressure-to-electrical transducer.

27. The invention of claim 22 wherein said sensor apparatus further includes wicking material substantially lining said elongate chamber.

28. The invention of claim 22 wherein said cooperating thermally isolating means comprises a hollow space defined substantially within said housing portion between said base portion and said elongate chamber.

29. The invention of claim 28 wherein said sensor apparatus further comprises thermal insulating material disposed within said hollow space.

30. In a turbo machine such as a jet engine or the like having a duct wherein flows nonisothermal combustion products, the method of performing an executive function such as assessing the operating condition of said machine, controlling the operation of said machine, and safeguarding said machine from potentially damaging operating conditions, said method comprising the steps of:

disposing a mass of two-phase material in a sensor chamber disposed transversely to the flow within said duct;

employing portions of said combustion products having differing temperatures to simultaneously cause opposing phase changes of said two-phase material;

sensing the temperature or pressure of the vapor phase of said two-phase material;

transducing said sensed temperature or pressure to an intelligible signal; and utilizing said signal in the performance of said executive function.

31. Sensor apparatus particularly for sensing a mean temperature of working fluid flowing within a flow path of a turbo machine, said sensor apparatus comprising:

a base portion adapted for securement to a wall of said turbo machine remotely from said flow path;

an elongate housing portion extending from said base portion and terminating in an end spaced therefrom, said base portion and said housing portion defining cooperating means for substantially thermally isolating one from the other, said housing portion being adapted to penetrate said turbo machine wall into said flow path and to extend substantially thereacross transversely to said working fluid flow, said housing portion substantially defining an elongate closed chamber extending from proximate said end toward said base portion, said elongate chamber substantially ending short of said base portion;

a predetermined quantity of two-phase material which simultaneously exists both as liquid and vapor at said arithmetic mean temperature disposed within said elongate chamber; and means in association with said elongate chamber for sensing one of the absolute pressure therein and the temperature of vapor therein, said sensing means further including means for transducing the second one of said absolute pressure and vapor temperature into an intelligible signal;

said sensing means including an elongate probe extending from said base portion into said elongate chamber of said housing portion, said transducing means comprising a temperature responsive element carried by said probe in heat exchange relation with vapor within said elongate chamber, said temperature responsive element being substantially thermally isolated from both said base portion and said housing portion;

said sensor apparatus further including wicking material substantially lining said elongate chamber.

32. The invention of claim 31 wherein said temperature responsive element comprises a thermocouple.

33. The invention of claim 31 wherein said sensing means comprises a passage communicating said absolute pressure from said elongate chamber to said base portion, said transducing means comprising a pressure responsive element disposed upon said base portion and communicating with said passage so as to respond to said absolute pressure.

34. The invention of claim 33 wherein said pressure responsive element comprises a pressure-to-electrical transducer.

35. The invention of claim 31 wherein said cooperating thermally isolating means comprises a hollow space defined substantially within said housing portion between said base portion and said elongate chamber.

36. The invention of claim 35 wherein said sensor apparatus further comprises thermal insulating material disposed within said hollow space.

37. Elongate sensor apparatus for producing a signal indicative of a mean of the temperature of fluid flowing within a flow path of a turbo machine; where said mean temperature (Tm) equals the inverse of X, multiplied by the integral of T between zero and $$X\left(Tm = \frac{1}{X} \int_0^X Tdx\right),$$

in which T represents temperature and X represents a linear dimension within said flow path; said fluid having a variety of differing temperature values considered at points along a length dimension of said sensor apparatus within said flow path, said apparatus comprising:

a housing including a base portion and an elongate sensing portion projecting from the latter to define said length dimension, said base portion comprising means for securing to said turbo machine remotely from said flow path with said sensing portion projecting therefrom through an aperture defined by a wall of said turbo machine which wall further bounds said flow path, said sensing portion extending substantially across said flow path substantially transversely to the direction of said fluid flow and further defining an elongate closed cavity extending longitudinally therein throughout said length dimension entirely within said flow path;

a quantity of two-phase liquid-vapor material disposed within said cavity;

wettable wicking means lining the interior of said closed cavity for wetting said interior with said two-phase material;

means for sensing one of a temperature value and a pressure value of the vapor phase of said two-phase material within said cavity and producing a signal in response thereto, whereby said signal is analogous to the mean temperature of said fluid within said flow path along said length dimension.

38. The invention of claim 37 wherein said base portion and said sensing portion include cooperating means for substantially thermally isolating said portion from one another.

39. The invention of claim 38 wherein said cooperating means comprises said sensing portion defining a hollow space intermediate said closed cavity and said base portion.

40. The invention of claim 39 further including thermally insulative material disposed within said hollow space.

41. The invention of claim 37 wherein said sensing means comprises a thermocouple, and means for disposing said thermocouple centrally of said closed cavity and substantially thermally isolated from said base portion.

42. The invention of claim 37 wherein said sensing means comprises means for producing said signal in response to the pressure level of the vapor phase of said two-phase material.

* * * * *

UNITED STATES PATENT AND TRADEMARK OFFICE
CERTIFICATE OF CORRECTION

PATENT NO. : 4,597,675
DATED : July 1, 1986
INVENTOR(S) : HANS F. W. MAERTINS, JAMES C. MAYS, and CHARLES E. CORRIGAN It is certified that error appears in the above-identified patent and that said Letters Patent are hereby corrected as shown below:

Claim 1, line 13, delete "means", insert -- mean --.

Claim 37, line 5, following "and", insert -- X --.

Claim 37, line 6 (the equation), delete "X" outside the parenthetical so that line 6 appears as below:

$$\left( T_m = \frac{1}{X} \int_0^X T dx \right).$$

Signed and Sealed this

Seventh Day of October, 1986

[SEAL]

Attest:

DONALD J. QUIGG

Attesting Officer

Commissioner of Patents and Trademarks